(No Model.)
T. B. REAGAN.
FRUIT GATHERER.
No. 504,245.   Patented Aug. 29, 1893.
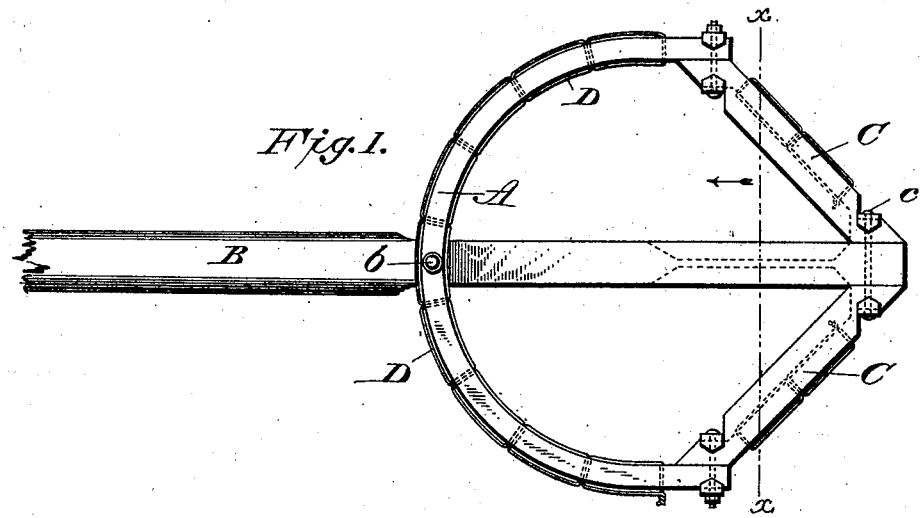
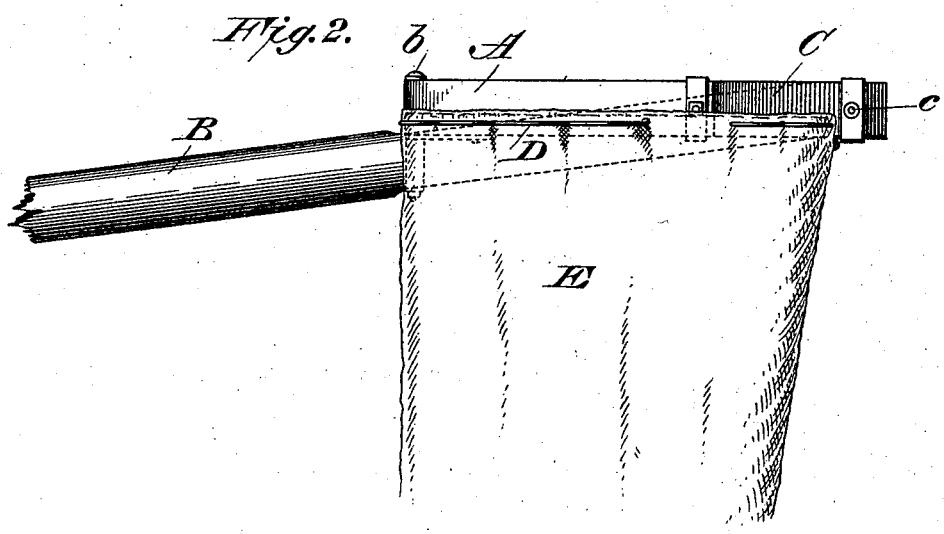
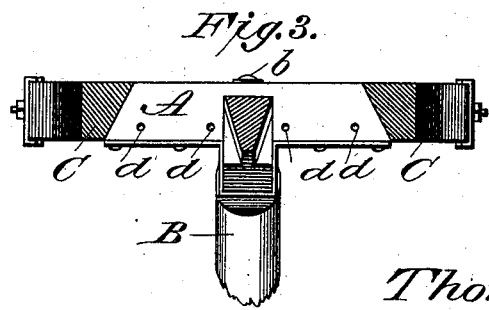
Witnesses
L. S. Elliott
M. Johnson
Thomas B. Reagan
Inventor
by
Attorney

UNITED STATES PATENT OFFICE.

THOMAS B. REAGAN, OF MAPLETON, KANSAS.

FRUIT-GATHERER.

SPECIFICATION forming part of Letters Patent No. 504,245, dated August 29, 1893.

Application filed December 29, 1892. Serial No. 456,661. (No model.)

*To all whom it may concern:*

Be it known that I, THOMAS B. REAGAN, a citizen of the United States of America, residing at Mapleton, in the county of Bourbon and State of Kansas, have invented certain new and useful Improvements in Fruit-Gatherers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in fruit gatherers and it consists in the construction and combination of the parts, as will be hereinafter fully set forth and particularly pointed out in the claims.

In the accompanying drawings forming part of this specification: Figure 1 is a plan view of a fruit gatherer constructed in accordance with my invention. Fig. 2 is a side elevation. Fig. 3 is a sectional view on the line $x\,x$ of Fig. 1.

A designates a semi-circular strip, of wood or other material, which is secured to the handle B by a bolt $b$ or other equivalent fastening device. To the ends of this strip are bolted two short pieces C C, which extend to and are secured to the end of the handle by means of a bolt $c$.

The parts A and C are provided with transverse perforations $d\,d$, through which are laced or otherwise secured lengths of wire D, said wires projecting a slight distance so as to receive the meshes of a woven receptacle or net into which the fruit falls, said net being designated by the letter E. The short pieces C C are beveled on their inner sides as shown in cross-section Fig. 3, while the handle is beveled on each side; this construction providing sharp edges which are adapted to bear against the stem of the fruit and sever it from the branch of the tree, and when severed the fruit will fall into the net. The handle may be of any suitable length.

A fruit gatherer constructed as hereinbefore described is very light and serviceable.

Having thus described my invention, what I claim as new, and desire to secure by Letters Patent, is—

1. In a fruit gatherer, the combination of the bow A attached to a handle, short pieces C C attached to the ends of the bow and to the end of the handle, the short pieces C and part of the handle opposite thereto being beveled as shown, and a net adapted to be carried by the parts hereinbefore mentioned, for the purpose set forth.

2. In a fruit gatherer, the combination of a handle, a bow attached thereto, short pieces C C attached to the ends of the bow and to the end of the handle, the inner sides of the pieces C C and the sides of the handle adjacent to said pieces being beveled to provide acute edges, and a net carried by the bow and pieces C C, substantially as shown, and for the purpose set forth.

In testimony whereof I affix my signature in presence of two witnesses.

THOMAS B. REAGAN.

Witnesses:
L. R. ROUTH,
W. H. D. NICHOLSON.